United States Patent
Nago

(10) Patent No.: US 9,193,413 B1
(45) Date of Patent: Nov. 24, 2015

(54) BICYCLE DISC BRAKE CALIPER

(71) Applicant: Shimano Inc., Sakai-shi, Osaka (JP)

(72) Inventor: Daisuke Nago, Sakai (JP)

(73) Assignee: Shimano Inc., Sakai-shi (JP)

( * ) Notice: Subject to any disclaimer, the term of this patent is extended or adjusted under 35 U.S.C. 154(b) by 0 days.

(21) Appl. No.: 14/302,308

(22) Filed: Jun. 11, 2014

(51) Int. Cl.
*F16D 55/2265* (2006.01)
*B62L 3/02* (2006.01)
*F16D 65/00* (2006.01)

(52) U.S. Cl.
CPC .............. *B62L 3/023* (2013.01); *F16D 65/0068* (2013.01); *F16D 55/2265* (2013.01)

(58) Field of Classification Search
CPC ......... B65B 1/04; F16D 55/228; B60T 11/10; B62L 3/023
USPC ............................ 188/72.4, 72.5, 352, 26, 2.4
See application file for complete search history.

(56) References Cited

U.S. PATENT DOCUMENTS

| | | | | |
|---|---|---|---|---|
| 8,272,484 | B1 * | 9/2012 | Dennis et al. ................ | 188/72.5 |
| 2004/0251093 | A1 * | 12/2004 | Simmons et al. ............ | 188/72.4 |
| 2008/0053759 | A1 * | 3/2008 | Tait .............................. | 188/71.6 |
| 2008/0296103 | A1 * | 12/2008 | Dennis et al. ................ | 188/72.4 |
| 2009/0200121 | A1 * | 8/2009 | Takizawa et al. ............ | 188/72.5 |
| 2009/0200128 | A1 * | 8/2009 | Takizawa et al. ............ | 188/369 |
| 2013/0048444 | A1 * | 2/2013 | Hirotomi et al. ............ | 188/73.31 |

* cited by examiner

*Primary Examiner* — Christopher Schwartz
(74) *Attorney, Agent, or Firm* — Alleman Hall McCoy Russell & Tuttle LLP

(57) ABSTRACT

A disc brake caliper is provided. The disc brake caliper may include a main body having a first portion, a second portion having no bleeding port, and a connecting portion connecting the first portion with the second portion such that a slot for arranging a disc rotor is defined between the first portion and the second portion. Arranged on the first portion are a first fluid port and a second fluid port fluidly connected to the first fluid port by a fluid flow path.

18 Claims, 6 Drawing Sheets

BICYCLE DISC BRAKE CALIPER

BACKGROUND

In recent years, certain high performance bicycles have included hydraulic disc brake systems. Hydraulic disc brake systems typically include a disc brake caliper and a brake lever. Upon the application of fluid pressure to the first and second pistons of the disc brake caliper from the brake lever, brake pads of the disc brake come into contact with a rotor, thereby applying frictional resistance and causing the bicycle to slow down or stop.

The disc brake caliper and the brake lever are in fluid communication with each other via a fluid conduit. The fluid conduit connects to the disc brake caliper via a first fluid port on the disc brake caliper. A second fluid port on the disc brake caliper is also provided to enable the brakes to be bled.

Prior disc brake calipers locate the first fluid port and second fluid port on opposite sides of a caliper main body relative to the rotor. This enables the fluid flow path to be routed simply and with a short fluid flow path length within the disc brake caliper itself. The fluid flow path enters a first side of the disc brake caliper, communicates with the first piston on the first side, and then travels to the other side and communicates with the second piston on the other side, and exits during bleeding of the lines via the second fluid port on the other side of the disc brake caliper.

However, in the prior disc brake calipers it is difficult to reduce their volume in a lateral direction of the bicycle due to the opposite arrangement of the first and second fluid ports.

SUMMARY

To address the above issues, a disc brake caliper is provided. According to a first aspect of the invention, the disc brake caliper may include a main body having a first portion, a second portion having no bleeding port, and a connecting portion connecting the first portion with the second portion such that a slot for arranging a disc rotor is defined between the first portion and the second portion. Arranged on the first portion are a first fluid port and a second fluid port fluidly connected with the first fluid port by a fluid flow path. One potential advantage of this configuration is that the first fluid port and second fluid port are both arranged on the first portion of the main body when the main body is coupled to the bicycle, allowing the main body to reduce its volume in a lateral direction of the bicycle.

In the first aspect, the first fluid port is arranged facing outside from the main body in a first direction, and the second fluid port is arranged facing outside from the main body in a second direction opposite to the first direction. One potential advantage of such a configuration is that the drainage, bleeding, and injection of hydraulic fluid through both fluid ports can be facilitated.

In the first aspect, the first direction is a forward direction and the second direction is a rearward direction in a state where the main body is coupled to a bicycle. One potential advantage of such a configuration is also that the drainage, bleeding, and injection of hydraulic fluid through both fluid ports can be facilitated.

In the first aspect, the fluid flow path extends from the first fluid port on the first portion through the first portion, the second portion, the connecting portion, and to the second fluid port. One potential advantage of such a configuration is that the fluid flow path allows fluid pressure to apply to both pistons and brake pads while avoiding any branching of the fluid flow path.

In the first aspect, the disc brake caliper comprises a first piston movable in a piston moving direction, and a second piston movable in an opposite piston moving direction. The first portion includes a first bore which is included in the fluid flow path and into which the first piston is movably arranged, and the second portion includes a second bore which is included in the fluid flow path and into which the second piston is movably arranged. One potential advantage of such a configuration is that the bores that form the fluid flow path are coupled to the brake pads through the pistons, enabling immediate response to fluid pressure.

In the first aspect, the fluid flow path extends from the first fluid port to the connecting portion, to the second bore, to the connecting portion, to the first bore, and to the second fluid port, in that order, which also has a potential advantage of shortening the fluid flow path in certain configurations while maintaining a fluid flow path with no branches, as described above.

In the first aspect, the disc brake caliper comprises a connecting bolt, and the main body has a receiving bore configured to extend through the first portion, the second portion and the connecting portion so as to receive a connecting bolt, and the fluid flow path includes a first passage provided between the receiving bore and the connecting bolt to connect the first fluid port with the second bore. This has the potential advantage of allowing a connecting bolt to define the fluid flow path, which shortens the fluid flow path while maintaining a fluid flow path with no branches, as described above.

In the first aspect, the fluid flow path includes a second passage which is formed within the connecting bolt so as to connect the second bore with the first bore, which also has a potential advantage of requiring just one connecting bolt to define the fluid flow path in the connecting portion, which reduces the number of components required for assembly while maintaining a fluid flow path with no branches, as described above.

In the first aspect, the main body is configured such that the first portion, the second portion, and the connecting portion are formed as a single unitary member, which has a potential advantage of cost reduction by reducing the number of components that are required for assembly.

In the second and third aspects, the fluid flow path extends from the first fluid port to the first bore, to the connecting portion, to the second bore, to the connecting portion, and to the second fluid port, in that order, which also has a potential advantage of shortening the fluid flow path in certain configurations while maintaining a fluid flow path with no branches, as described above.

In the second aspect, the main body is configured such that the first portion, the second portion, and the connecting portion are formed in at least two separate members, which has a potential advantage of reducing the complexity of each component.

In the second aspect, the main body has a receiving bore configured to extend through the first portion, the second portion and the connecting portion so as to receive a connecting bolt, and the fluid flow path includes a first passage provided between the receiving bore and the connecting bolt to connect the first fluid port with the second bore. This has the potential advantage of allowing a connecting bolt to define the fluid flow path, which shortens the fluid flow path while maintaining a fluid flow path with no branches.

In the second aspect, where the main body has an additional receiving bore configured to extend through the first portion, the second portion, and the connecting portion so as to receive an additional connecting bolt, the fluid flow path includes a second passage provided within the additional receiving bore and the additional connecting bolt to connect the second bore with the second fluid port, which also has a potential advantage of requiring just one connecting bolt to define the fluid flow path in the connecting portion, which reduces the number of components required for assembly while maintaining a fluid flow path with no branches, as described above.

In the second aspect, at least a portion of the receiving bore and at least a portion of the additional receiving bore extend in a parallel direction with respect to a piston moving direction, which has a potential advantage of allowing the hydraulic fluid to pass through both pistons using the shortest fluid flow path.

In the third aspect, the main body is configured such that the first portion, the second portion, and the connecting portion are formed as a single unitary member, which has a potential advantage of cost reduction by reducing the number of components that are required for assembly.

In the third aspect, the disc brake caliper comprises a first sealing cap and a second sealing cap; the fluid flow path has a first part connecting the first bore with the second bore, and having a first opening sealed by a first sealing cap, and a second part connecting the second bore with the second fluid port, and having a second opening sealed by a second sealing cap. This also has a potential advantage of avoiding the need to define a fluid flow path within a connecting bolt, potentially reducing the number of components that are required for assembly.

In the third aspect, the first opening and the second opening are provided on the first portion, which allows the main body to reduce its volume in a lateral direction of the bicycle.

In the third aspect, the at least a portion of the first part and at least a portion of the second part extend in a parallel direction with respect to a piston moving direction, which has a potential advantage of allowing the hydraulic fluid to pass through both pistons using the shortest fluid flow path.

In the first aspect, the hydraulic disc brake caliper has a first portion that is arranged closer to a wheel than a second portion in a state where the main body is coupled to a bicycle. One potential advantage of this configuration is also that this allows the hydraulic lines to be hidden for appearance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 1-6 are drawn approximately to scale unless otherwise indicated; however, other relative dimensions may be used, if desired.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
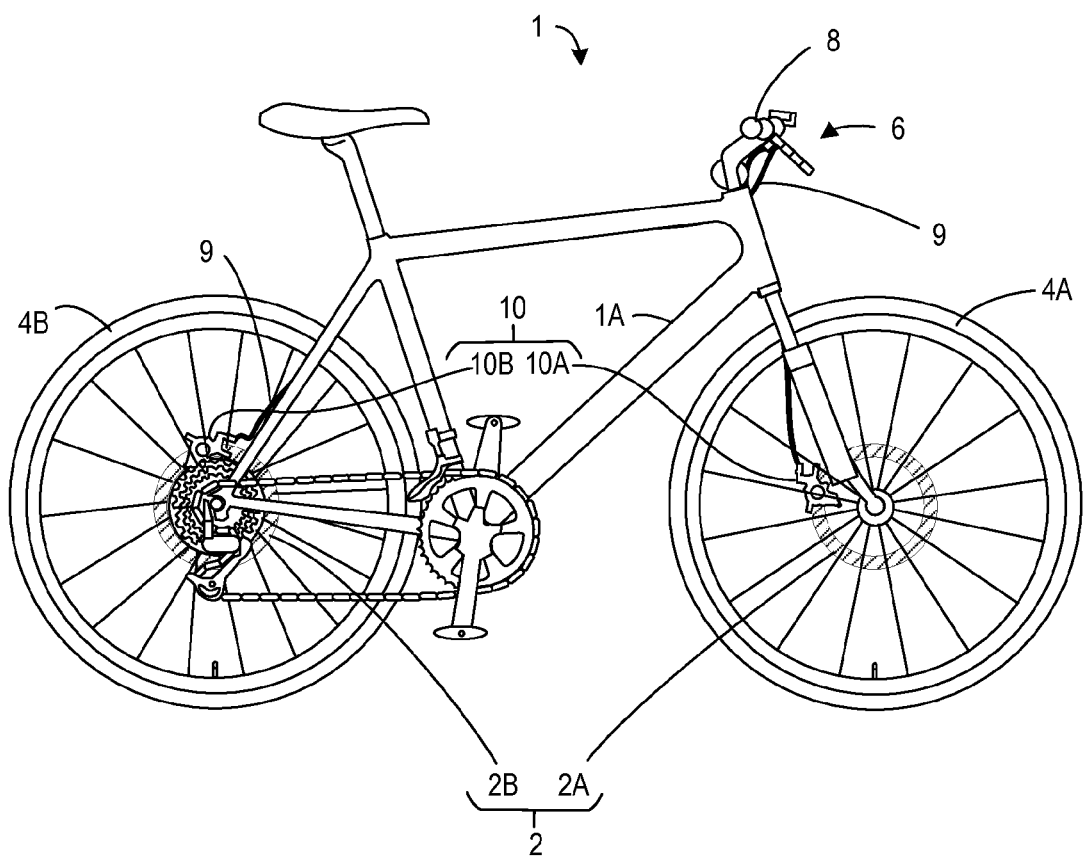
FIG. 1 shows a side view of an example bicycle with hydraulic disc brake calipers according to a first embodiment of the present invention.

Referring initially to FIG. 1, a bicycle 1 includes a frame 1A, and a pair of disc brake calipers 10 for gripping corresponding disc rotors 2, according to one example embodiment. Front disc brake caliper 10A is attached to a front fork of the frame 1A to grip a disc rotor 2A of a front wheel 4A for applying stopping force to the front wheel 4A. Rear disc brake caliper 10B is attached to a chain stay or seat stay of the frame 1A to grip a disc rotor 2B of a rear wheel 4B for applying stopping force to the rear wheel 4B. A pair of brake operating devices 6, each including a respective finger actuated lever assembly, are preferably coupled to a handle bar 8 of the bicycle 1. The pair of brake operating devices 6 are connected to the disc brake calipers 10 by hydraulic lines 9, respectively. Actuation of the brake operating devices 6 by gripping of the lever assemblies causes fluid such as mineral oil to exit an associated master cylinder, travel through the hydraulic lines 9 to each of the disc brake calipers 10. As the fluid travels into the disc brake calipers 10, it forces pistons contained therein to grip the front and rear disc rotors 2A, 2B, thereby applying stopping force to the front and rear wheels 4A, 4B, respectively. Since the disc brake calipers 10 have substantially same construction, only one of the disc brake calipers 10 is illustrated in detail hereinafter for the sake of brevity.

Figure 2:
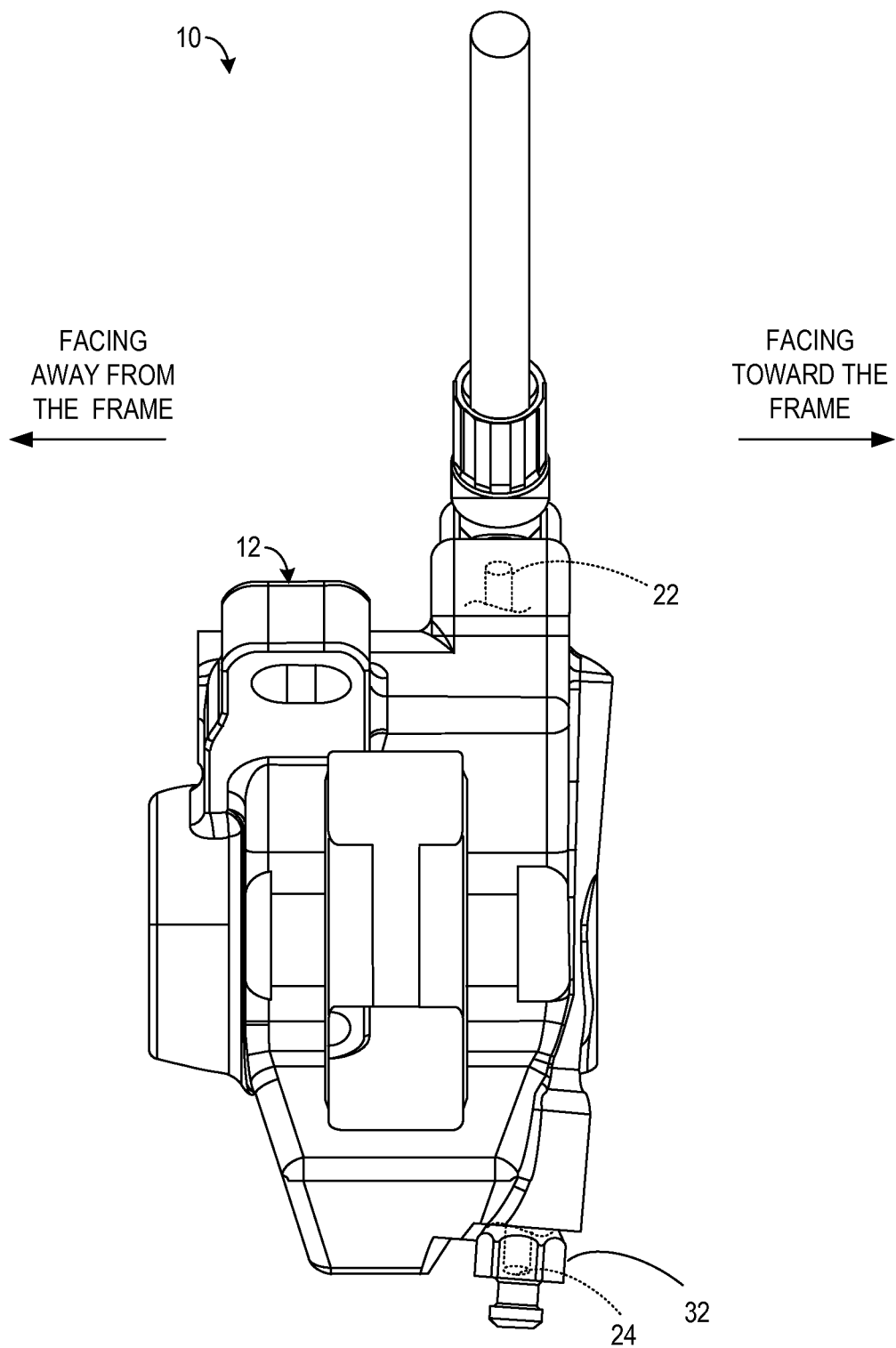
FIG. 2 is a top plan view of the disc brake caliper of FIG. 1.
Figure 3:
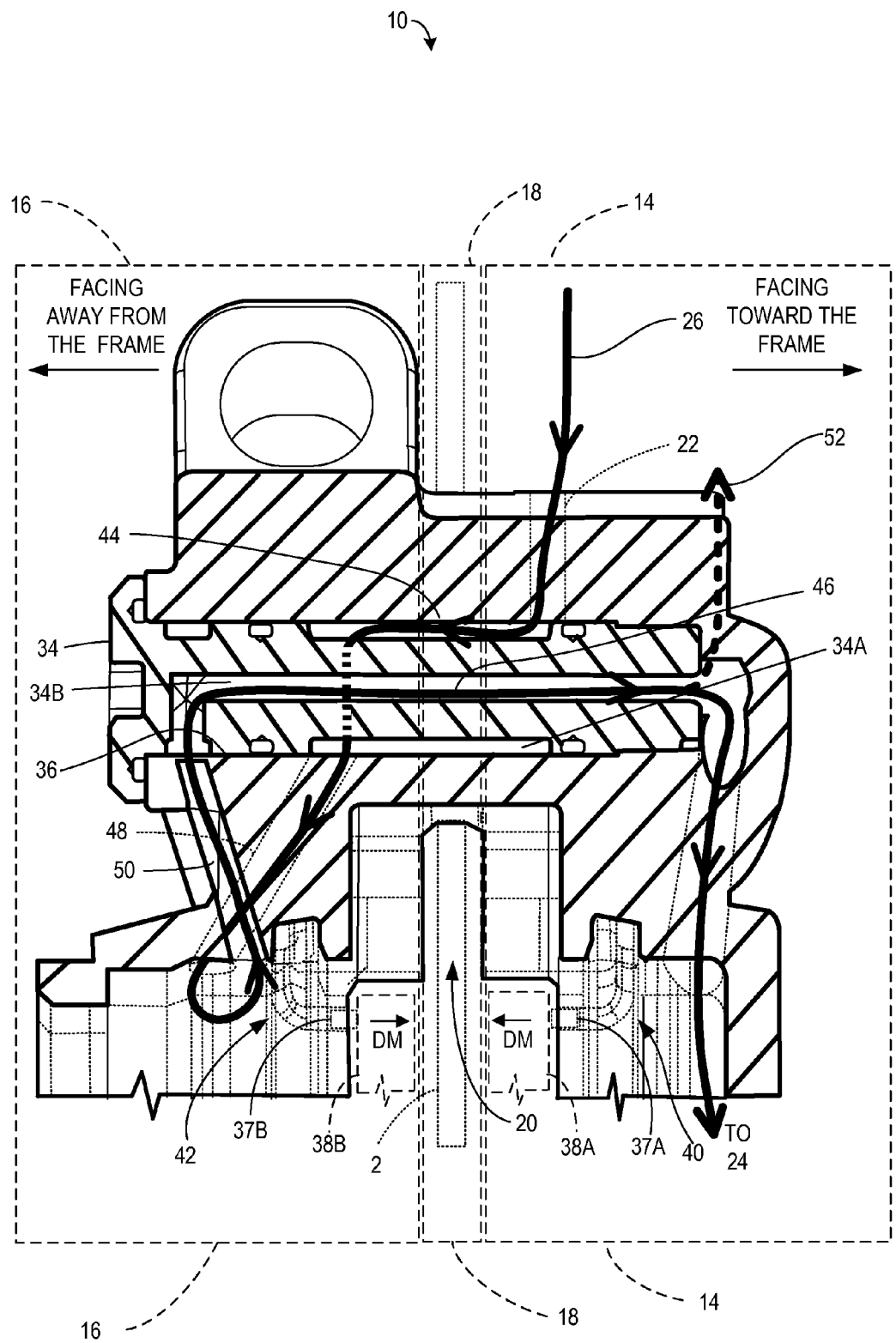
FIG. 3 is a cross-sectional view of the disc brake caliper.

As shown in FIGS. 2 and 3, the disc brake caliper 10 includes a main body 12 that is preferably formed of rigid metallic material such as aluminum alloy. As shown in FIG. 3, the main body 12 includes a first portion 14, a second portion 16 having no bleeding port, a connecting portion 18 connecting the first portion 14 with the second portion 16 such that a slot 20 for arranging the disc rotor 2 is defined between the first portion 14 and the second portion 16. In this embodiment, the main body 12 is configured such that the first portion 14, the second portion 16 and the connecting portion 18 are formed as a single unitary member.

The main body 12 further includes a first fluid port 22 and a second fluid port 24 (FIG. 2). The second fluid port 24 is fluidly connected with the first fluid port 22 by a fluid flow path 26 (FIG. 3). The first fluid port 22 is arranged on the first portion 14. The second fluid port 24 is arranged on the first portion 14. In this illustrated embodiment, the first fluid port 22 functions as an inflow port, and the second fluid port 24 functions as an outflow port. A banjo fixing bolt 28 (FIG. 4) is mounted in the first fluid port 22 to attach a banjo 30 onto the main body 12. The banjo 30 is coupled to the brake operating device 6 via the hydraulic line 9. A bleed valve 32 is mounted in the second fluid port 24, which allows an operator to perform maintenance by opening the bleed valve 32 and bleed the fluid out of a hydraulic brake system.

Now referring to FIG. 3, the first portion 14 is arranged closer to a corresponding wheel 4A or 4B of the bicycle 1 having frame 1A than the second portion 16 in a state where the main body 12 is coupled to the frame 1A of bicycle 1. The disc brake caliper 10 further comprises a connecting bolt 34. The main body 12 has a receiving bore 36 configured to extend through the first portion 14, the second portion 16, and the connecting portion 18 so as to receive the connecting bolt 34. The connecting bolt 34 is positioned within the slot 20. The connecting bolt 34 has a recessed portion 34A along its outer periphery and an internal bore 34B extending through its core. The recessed portion 34A and the internal bore 34B define channels forming part of the fluid flow path 26 along which the fluid may flow, as described in detail below.

The disc brake caliper 10 further comprises a first piston 37A movable in a piston moving direction DM, and a second piston 37B movable in an opposite piston moving direction DM. When the brake operating device 6 is actuated, the fluid flows into the disc brake calipers 10, which moves first and second brake pads 38A and 38B from a release position in which the disc rotor 2 is free to rotate to a braking position in which the first and second pads 38A and 38B contact the disc rotor 2. In the braking position, the first and second brake pads 38A and 38B apply a braking force against the disc rotor 2. On the first portion 14, the first brake pad 38A is coupled to the first piston 37A. On the second portion 16, the second brake pad 38B is coupled to a second piston 37B.

In this embodiment, the fluid flow path 26 extends from the first fluid port 22 on the first portion 14 through the first portion 14, the second portion 16 and the connecting portion 18, and to the second fluid port 24 on the first portion 14. The first portion 14 includes the first bore 40 which is included in the fluid flow path 26 and into which the first piston 37A is movably arranged. The first piston 37A is coupled to the first brake pad 38A on the first portion 14. The second portion 16 includes the second bore 42 which is included in the fluid flow path 26 and into which the second piston 37B is movably arranged. The second piston 37B is coupled to the second brake pad 38B on the second portion 16. In this embodiment, the fluid flow path 26 extends from the first fluid port 22 to the connecting portion 18, to the second bore 42, to the connecting portion 18, to the first bore 40, and to the second fluid port 24, in that order. This enables the fluid flow path 26 to begin and end on the same side of the main body 12 facing toward the frame 1A.

In this embodiment, the fluid flow path 26 includes a first passage 44 provided between the receiving bore 36 and the connecting bolt 34 to connect the first fluid port 22 with the second bore 42. In more detail, the first passage 44 is provided between an inner peripheral surface of the receiving bore 36 and the recessed portion 34A of the connecting bolt 34. Further, the fluid flow path 26 includes a second passage 46 formed within the connecting bolt 34 so as to connect the second bore 42 with the first bore 40. In more detail, the second passage 46 is formed in the internal bore 34B of the connecting bolt 34. Thus, it will be appreciated that the first passage 44 and second passage 46 are formed by channels of the connecting bolt 34. Specifically, an external channel on the connecting bolt 34 defines the first passage 44, while an internal channel within the connecting bolt 34 defines second passage 46. The first passage 44 communicates with the first fluid port 22 and a third passage 48 leading to the second bore 42. A fourth passage 50 leads from second bore 42 to the second passage 46 of the connecting bolt 34, which in turn is fluidly connected with first bore 40. The fluid flow path 26 passes from first bore 40 to the second fluid port 24. It should be noted that in alternative embodiments, the fluid flow path from the first bore 40 to the second fluid port 24 may extend in an alternative direction, where the second fluid port is adjacent to the first fluid port, as indicated by the fluid flow path 52.

Figure 4:
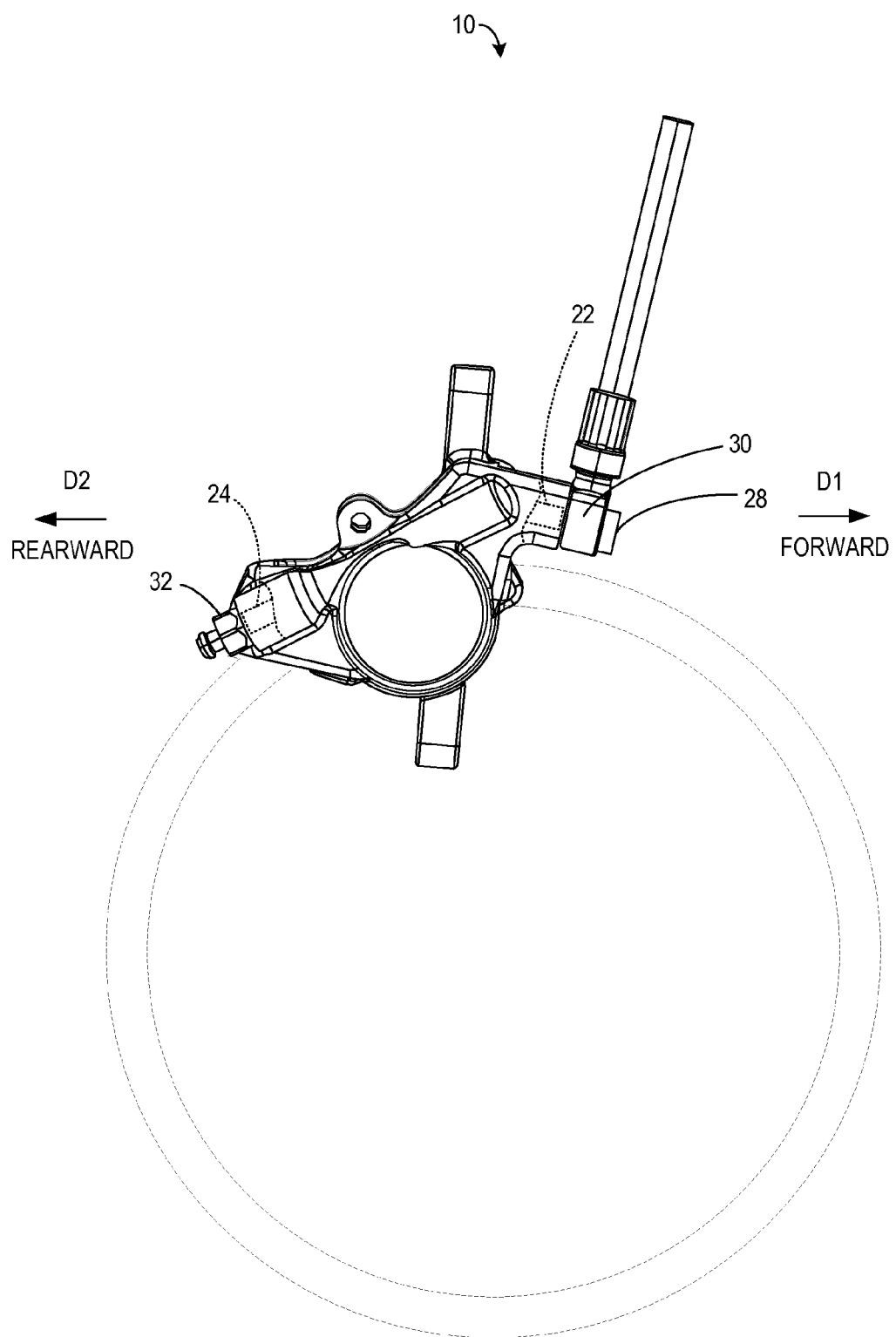
FIG. 4 is a wheel side perspective of the disc brake caliper of FIG. 2.

As illustrated in FIG. 4, the first fluid port 22 faces an outside of the main body 12 in a first direction D1, and the second fluid port 24 faces the outside in a second direction D2 being opposite to the first direction D1. Specifically, in the illustrated embodiment, the first direction D1 is a forward direction and the second direction D2 is a rearward direction in the state where the main body 12 is coupled to the frame 1A of the bicycle 1. More specifically, the first direction D1 in which the first fluid port 22 faces is forward, while the second direction D2 in which the second fluid port 24 faces is rearward and downward. It should be noted that in alternative embodiments, the second fluid port may be adjacent to the first fluid port and face the same direction as the first fluid port, as indicated by fluid flow path 52 in FIG. 3.

As discussed above, the first fluid port 22 and the second fluid port 24 are both purposely arranged on the first portion 14, so that the second portion 16 lacks any fluid inlets or outlets, including bleeding ports.

Figure 5:
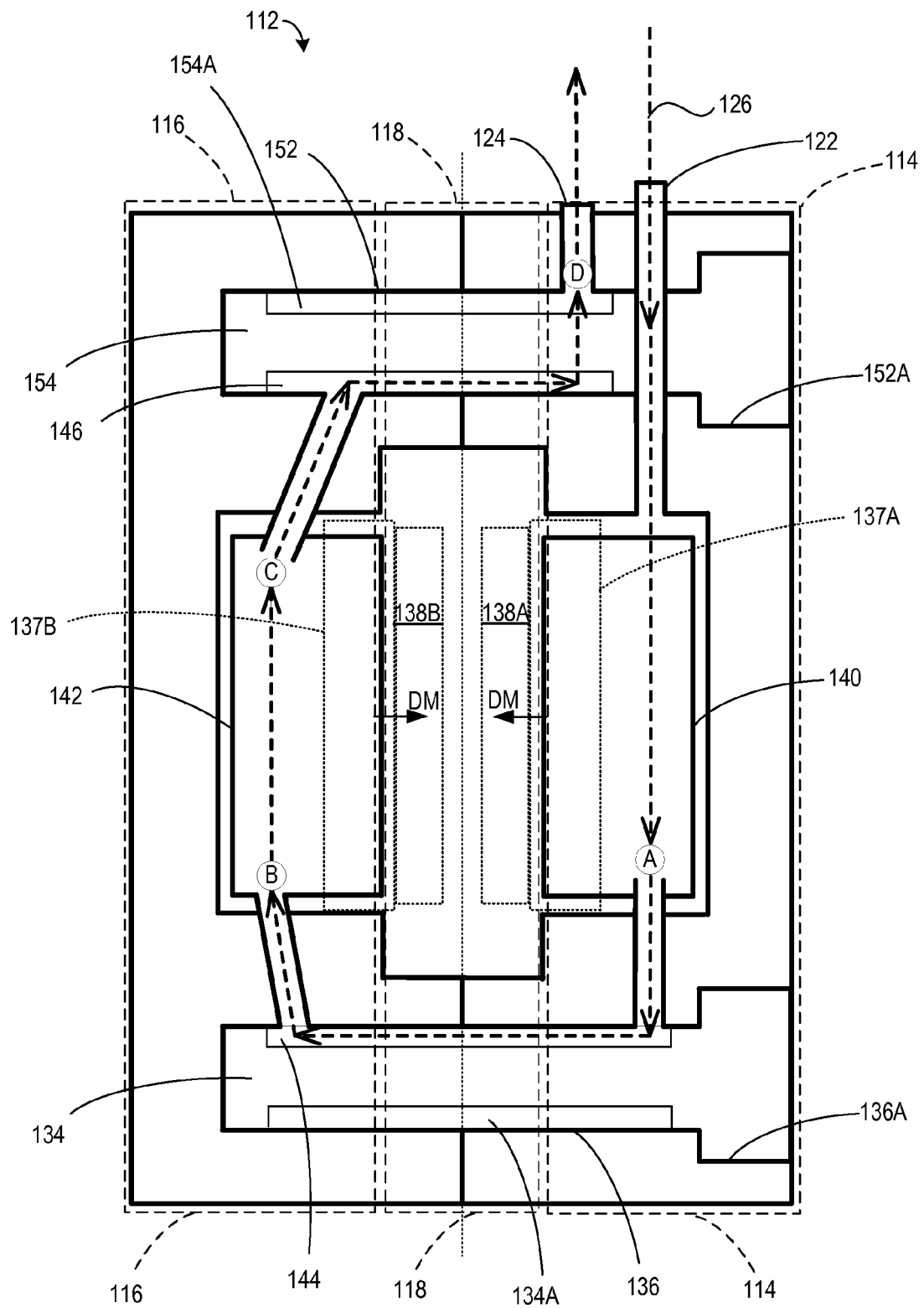
FIG. 5 is a schematic view of a fluid flow path of a disc brake caliper according to a second embodiment of the present invention.

FIG. 5 schematically illustrates a disc brake caliper 110 according to a second embodiment of the present invention. The disc brake caliper 110 is similar to the disc brake caliper 10 described above and will not be re-described except where differences exist, for the sake of brevity.

In the disc brake caliper 110, a main body 112 is configured such that a first portion 114, a second portion 116 and a connecting portion 118 are formed in at least two separate members. More specifically, the main body 112 is configured by first and second members such that the first portion 114 and part of the connecting portion 118 are arranged on the first member and the second portion 116 and the other part of the connecting portion 118 are arranged on the second member. In the main body 112, a fluid flow path 126 extends from the first fluid port 122 to a first bore 140 of the first portion 114, to the connecting portion 118, to a second bore 142 of the second portion 116, to the connecting portion 118, and to a second fluid port 124, in that order.

More specifically, the fluid flow path 126 has a first part (extending from points A to B) connecting the first bore 140 with the second bore 142 through the connecting portion 118. The first part provides a receiving bore 136 configured to extend through the first portion 114, the second portion 116 and the connecting portion 118 so as to receive a connecting bolt 134. The receiving bore 136 has a first opening 136A through which the connecting bolt 134 is inserted to couple the first and second members of the main body 112. The connecting bolt 134 has a recessed portion 134A. A first passage 144 is provided between the receiving bore 136 and the connecting bolt 134 by the recessed portion 134A to connect the first bore 140 with the second bore 142.

Further, the fluid flow path 126 has a second part (extending from points C to D) connecting the second bore 142 with the second fluid port 124 through the connecting portion 118. The second part provides an additional receiving bore 152 configured to extend through the first portion 114, the second portion 116 and the connecting portion 118 so as to receive an additional connecting bolt 154. The additional receiving bore 152 has a second opening 152A through which the additional connecting bolt 154 is inserted to couple the first and second members of the main body 112. The additional connecting bolt 154 has a recessed portion 154A. A second passage 146 is provided between the additional receiving bore 152 and the additional connecting bolt 154 by the recessed portion 154A to connect the second bore 142 with the second fluid port 124.

In this embodiment, the receiving bore 136 and the additional receiving bore 152 extend in a parallel direction with respect to a piston moving direction DM of first and second pistons 137A and 137B, which are coupled to the first and second brake pads 138A and 138B, respectively. In other words, at least a portion of the first part and at least a portion of the second part extend in a parallel direction with respect to the piston moving direction DM. This arrangement enables the fluid flow path 126 to begin and end on the same side of the main body 112 facing toward the frame 1A.

Figure 6:
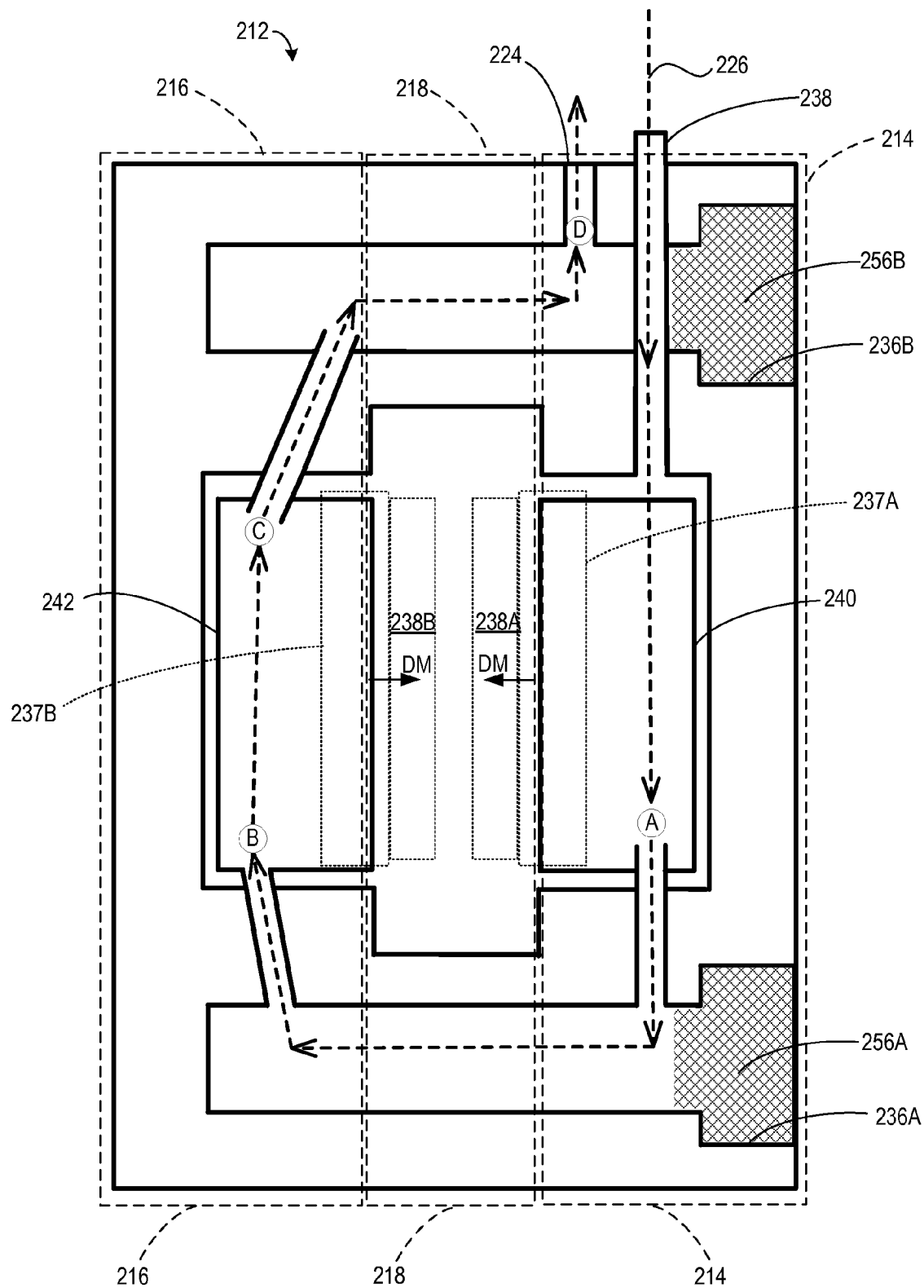
FIG. 6 is a schematic view of a fluid flow path of a disc brake caliper according to a third embodiment of the present invention.

FIG. 6 schematically illustrates a disc brake caliper 210 according to a third embodiment of the present invention. The disc brake caliper 210 is similar to disc brake caliper 110 described above and will not be re-described except where differences exist, for the sake of brevity.

In the disc brake caliper 210, a main body 212 is configured such that a first portion 214, a second portion 216 and a connecting portion 218 are formed as a single unitary member. The disc brake caliper 210 comprises a first sealing cap 256A and a second sealing cap 256B.

A fluid flow path 226 has a first part (extending from points A to B) connecting a first bore 240 with a second bore 242 through the connecting portion 218. The first part has a first opening 236A sealed by the first sealing cap 256A. The fluid flow path 226 has a second part (extending from points C to D) connecting the second bore 242 with the second fluid port 224 through the connecting portion 218. The second part has a second opening 236B sealed by the second sealing cap 256B. At least a portion of the first part and at least a portion of the second part extend in a parallel direction with respect to a piston moving direction DM of first and second pistons 237A and 237B, which are coupled to the first and second brake pads 238A and 238B, respectively. This arrangement enables the fluid flow path 226 to begin and end on the same side of the main body 212 facing toward the frame 1A.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The terms of degree such as "approximately" as used herein mean a reasonable amount of deviation of the modified term such that the end result is not significantly changed (e.g., manufacturing tolerances).

While specific embodiments of the bicycle and hydraulic disc brake caliper have been described in detail, the particular arrangements disclosed are meant to be illustrative only and not limiting. The features of the various embodiments described above, as well as modifications thereof, may be variously combined without departing from the scope of this disclosure.

The invention claimed is:

1. A disc brake caliper comprising:
a main body including:
a first portion;
a second portion having no bleeding port;
a connecting portion connecting the first portion with the second portion such that a slot for arranging a disc rotor is defined between the first portion and the second portion;
a first fluid port arranged on the first portion; and
a second fluid port fluidly connected with the first fluid port by a fluid flow path, the second fluid port being arranged on the first portion;
wherein the first fluid port faces an outside of the main body in a first direction, and the second fluid port faces the outside of the main body in a second direction opposite to the first direction, and the first and second directions are substantially parallel to a plane defined by the slot.

2. The disc brake caliper of claim 1, wherein the fluid flow path extends from the first fluid port on the first portion through the first portion, the second portion and the connecting portion, and to the second fluid port.

3. The disc brake caliper of claim 2, further comprising a first piston movable in a piston moving direction, and a second piston movable in the piston moving direction,
wherein the first portion includes a first bore which is included in the fluid flow path and into which the first piston is movably arranged, and the second portion includes a second bore which is included in the fluid flow path and into which the second piston is movably arranged.

4. The disc brake caliper of claim 3, wherein the fluid flow path extends from the first fluid port to the first bore, to the connecting portion, to the second bore, to the connecting portion, and to the second fluid port, in that order.

5. The disc brake caliper of claim 4, wherein the main body is configured such that the first portion, the second portion and the connecting portion are formed in at least two separate members.

6. The disc brake caliper of claim 5, further comprising a connecting bolt,
wherein the main body has a receiving bore configured to extend through the first portion, the second portion and the connecting portion so as to receive the connecting bolt, and the fluid flow path includes a first passage provided between the receiving bore and the connecting bolt to connect the first bore with the second bore.

7. The disc brake caliper of claim 6, further comprising an additional connecting bolt,
wherein the main body has an additional receiving bore configured to extend through the first portion, the second portion and the connecting portion so as to receive the additional connecting bolt, and the fluid flow path includes a second passage provided between the additional receiving bore and the additional connecting bolt to connect the second bore with the second fluid port.

8. The disc brake caliper of claim 7, wherein at least a portion of the receiving bore and at least a portion of the additional receiving bore extend in a parallel direction with respect to the piston moving direction.

9. The disc brake caliper of claim 4, wherein the main body is configured such that the first portion, the second portion and the connecting portion are formed as a single unitary member.

10. The disc brake caliper of claim 9, further comprising a first sealing cap and a second sealing cap,
wherein the fluid flow path includes a first part connecting the first bore with the second bore and having a first opening sealed by the first sealing cap, and the fluid flow path includes a second part connecting the second bore with the second fluid port and having a second opening sealed by the second sealing cap.

11. The disc brake caliper of claim 10, wherein the first opening and the second opening are provided on the first portion.

12. The disc brake caliper of claim 10, wherein at least a portion of the first part and at least a portion of the second part extend in a parallel direction with respect to the piston moving direction.

13. The disc brake caliper of claim 3, wherein the fluid flow path extends from the first fluid port to the connecting portion, to the second bore, to the connecting portion, to the first bore, and to the second fluid port, in that order.

14. The disc brake caliper of claim 13, further comprising a connecting bolt,
    wherein the main body has a receiving bore configured to extend through the first portion, the second portion and the connecting portion so as to receive the connecting bolt, and the fluid flow path includes a first passage provided between the receiving bore and the connecting bolt to connect the first fluid port with the second bore.

15. The disc brake caliper of claim 14, wherein the fluid flow path includes a second passage formed within the connecting bolt so as to connect the second bore with the first bore.

16. The disc brake caliper of claim 15, wherein the main body is configured such that the first portion, the second portion and the connecting portion are formed as a single unitary member.

17. The disc brake caliper of claim 1, wherein the first direction is a forward direction and the second direction is a rearward direction in a state where the main body is coupled to a bicycle.

18. The disc brake caliper of claim 1, wherein the first portion is arranged closer to a wheel than the second portion in a state where the main body is coupled to a bicycle.

\* \* \* \* \*